No. 711,366. Patented Oct. 14, 1902.
B. R. SWORDS.
NUT LOCK.
(Application filed July 5, 1902.)
(No Model.)
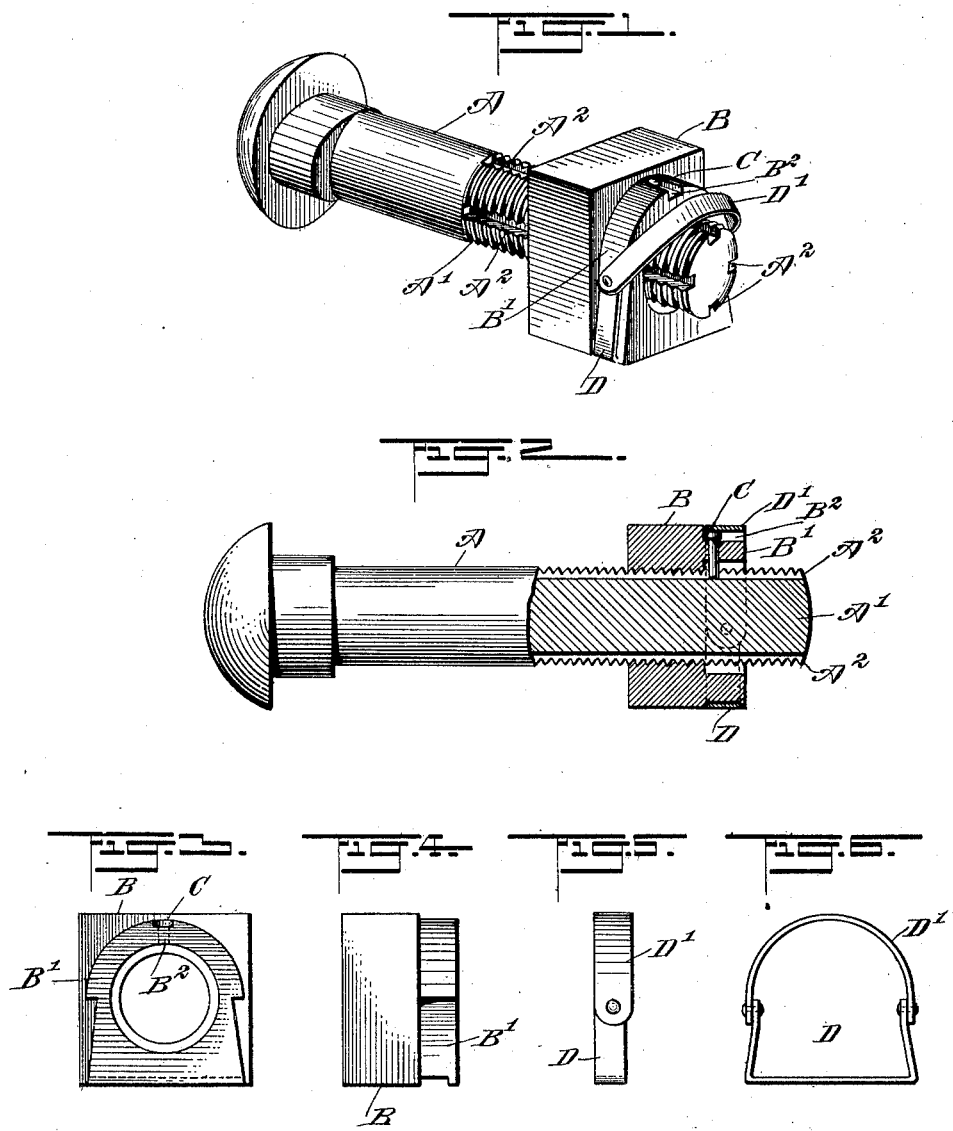
WITNESSES:
INVENTOR
Byron Ross Swords
BY
ATTORNEYS.

UNITED STATES PATENT OFFICE.

BYRON ROSS SWORDS, OF OTTAWA, ILLINOIS.

NUT-LOCK.

SPECIFICATION forming part of Letters Patent No. 711,366, dated October 14, 1902.

Application filed July 5, 1902. Serial No. 114,497. (No model.)

*To all whom it may concern:*

Be it known that I, BYRON ROSS SWORDS, a citizen of the United States, and a resident of Ottawa, in the county of Lasalle and State of Illinois, have invented a new and Improved Nut-Lock, of which the following is a full, clear, and exact description.

The object of the invention is to provide a new and improved nut-lock designed for use on bolts for rails, fish-plates, blocks and other parts, machines, and devices, which nut-lock is simple and durable in construction and arranged to permit of screwing up the nut to the desired degree and then locking it securely against accidental unscrewing.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a longitudinal sectional elevation of the same. Fig. 3 is a face view of the nut. Fig. 4 is a side elevation of the same. Fig. 5 is a similar view of the yoke, and Fig. 6 is a face view of the yoke.

The shank A of the bolt is provided at its threaded portion A' with a plurality of spaced longitudinally-extending grooves $A^2$, and on the said threaded portion A' screws a nut B, formed at one end with a reduced portion B', from the periphery of which leads a radially-extending aperture $B^2$ to the bore of the nut, as plainly illustrated in Fig. 2. This aperture $B^2$ is adapted to receive a pin C, resting with its head on the periphery of the reduced portion B' and extending with its inner end into one of the longitudinal grooves $A^2$, so as to hold the nut B against accidental unscrewing.

In order to hold the pin C against accidental displacement in the aperture $B^2$, I provide a holding device consisting, essentially, of a yoke D, having a pivoted bail D', adapted to swing over the head of the pin C, as plainly shown in Fig. 2, to hold the pin against outward movement in the aperture $B^2$.

The yoke D and its bail D' engage the reduced portion B' of the nut, and the said yoke D is made U shape and has its sides bent inwardly to engage correspondingly-inclined side faces on the reduced portion, as plainly shown in Fig. 3, to form a dovetail to hold the yoke D in position on the reduced portion against lateral displacement. The bottom of the yoke fits a transverse groove in the reduced portion to hold the yoke against longitudinal displacement.

The part of the reduced portion of the bail D' is preferably half-round, the same as the bail, to permit of conveniently swinging the bail in position after the nut is screwed up and the pin C is inserted. The space for the head of the pin is preferably extended to the face of the nut, so as to form a prying-opening for removing the pin whenever it is desired to unscrew the nut from the bolt.

When using the bolt, the nut is screwed up in the usual manner on the threaded portion A', and when the nut is screwed up the desired degree to fasten the parts in position then the bail D' is swung into an open position, as shown in Fig. 1, after which the pin C is inserted into the aperture $B^2$ to engage with its inner end the registering groove $A^2$ in the shank of the bolt. The bail D' is now moved into a closed position to hold the pin against outward movement, so that the nut B remains firmly locked on the threaded portion A' of the shank A. When it is desired to unscrew the nut B, the operator swings the bail D' into an open position, then pries out the pin C to allow of unscrewing the nut from the threaded portion.

Having thus described my invention, I claim as new and desire to secure by Letters Patent—

1. A nut-lock comprising a pin inserted in an aperture in the nut, to engage a longitudinal groove in the shank of a bolt, and a yoke on the nut, having a bail adapted to swing over the pin, to hold the latter against displacement in the the aperture and groove, as set forth.

2. A nut having a reduced portion, an aperture leading from the periphery of the reduced portion to the bore of the nut, and a yoke having a bail and engaging the reduced portion, the bail being adapted to be swung over the outer end of the said aperture, as set forth.

3. The combination with a bolt having longitudinal grooves, of a nut screwing on the bolt and having a reduced portion at one end, an aperture leading from the periphery of the reduced portion to the bore of the nut, to register with one of the longitudinal grooves, a pin in the said aperture, to engage the grooves, and a yoke on the reduced portion, having a bail adapted to swing over the outer end of the pin, to hold the latter against displacement in the aperture, as set forth.

In testimony whereof I have signed my name to this specification in the presence of two subscribing witnesses.

BYRON ROSS SWORDS.

Witnesses:
  O. B. WHEELER,
  B. F. COLEHOWER.